United States Patent [19]

Malin

[11] 3,846,564

[45] Nov. 5, 1974

[54] EDIBLE MIXTURE

[76] Inventor: Denis J. Malin, 13 Brandville Gardens, Essex, England

[22] Filed: Sept. 12, 1972

[21] Appl. No.: 288,284

[52] U.S. Cl. .............................. 426/212, 426/371
[51] Int. Cl. ............................................... A23l 1/31
[58] Field of Search ........... 99/14, 17, 18, 108, 109; 426/212, 371

[56] References Cited
UNITED STATES PATENTS
3,482,998  12/1969  Carroll et al. ........................ 426/371

*Primary Examiner*—James R. Hoffman
*Attorney, Agent, or Firm*—Fay & Sharpe

[57] ABSTRACT

An edible mixture for forming into a patty used in a sandwich which includes textured protein, comminuted animal glandular tissue, comminuted animal muscle tissue and salt and spices to taste. The glandular tissue is selected from the group consisting of kidney, liver, heart, gizzard, sweetbreads and mixtures thereof.

17 Claims, No Drawings

EDIBLE MIXTURE

BAKGROUND AND BRIEF DESCRIPTION OF THE INVENTION

At one point in time the inventor was exploring the possibility of becoming a franchisee of an American fast food chain specializing in hamburgers. on inquiry it was suggested by the franchisor that he observe the operations in Frankfurt, Germany, to understand the European operations, it was his intention to open his facility in England.

On arriving at the facility in Frankfurt, Germany it was observed that the four restaurants in that city were successful or unsuccessful, directly in proportion to the available American purchasing public in the vicinity of the restaurant. Those very near to a railroad station, an American Military post, or the like were financially successful. Those located in a very German neighborhood were monitarily unsuccessful. This observation led to further investigations which revealed that regardless of the location of the facility the German purchasing public was very small.

Several inquiries and deductions led to the conclusion that the reason for the lack of appeal to German nationals was the lack of a contemporarily accepted flavor, compatable with the local gastronomic custom. Americans are used to the hamburger flavor. Germans are not used to the hamburger flavor. Similar observations are equally applicable to British citizens and thus it was concluded that the traditional American hamburger flavor is not a marketable product on the European Continent, at least not to the same extent as it is in the United States. Later, similar selling patterns were observed in other countries and apparently for the same reasons.

The need was to increase sales to the local population and one way to do that was to have a variable flavor for the product, depending on the local customs. For example, the kidney flavor of steak and kidney pie in England is accepted and desirable; the flavor of liver from liverwurst, etc., is acceptable in Germany; and the flavor of ground beef garnished with tomato, lettuce, onion, ketchup and almost anything else in the garden is relished by the American palate.

With this knowledge and on approaching the franchisor concerning this concept, the alternate flavor modification suggestion depending on geographic area was rejected. Obviously, the franchisor needed to maintain a product of uniform quality and this could not be accomplished by varying the recipe for the product from one restaurant to another.

The conclusion of the inventor was that a franchise arrangement embodying a uniformly flavored product was an unacceptable arrangement. However, during the course of his research in the various areas for finding a proper, compatible and marketable product in the fast food area he had come across a product consisting of textured protein fibers mixed with various flavoring and binding agents, alleged to have the flavor and texture of beef, chicken, etc. On inquiry he discovered that the unit price of textured protein is much less than that of ground beef and concluded that there might be a possibility of combining ground beef with edible textured protein and providing a product of comparable flavor which was less expensive, namely, a sandwich patty comprising ground beef and textured protein. Later research in the Patent Office revealed U.S. Pat. No. 3,482,998 to Carroll, et al. which showed that the combination of edible protein fibers with natural ground meat was an old concept, although this patent was not discovered until after the invention was completely reduced to practice and had no bearing on the inventive reasoning.

As the inventor was later to find out, one of the great problems with the textured protein fibers is to bind them together such that they will retain their meaty texture and appearance while they are being cooked and afterwards. Unfortunately, the textured protein does not inherently bind itself together either before, during or after cooking as does meat. Rather it will simply fall apart into discrete units. As the aforementioned patent to Carroll, et al revealed there are numerous extenders and binders in the art as well as a plurality of sources of protein. The patent also describes the spinning mechanism and chemical treatment baths to process the protein fibers prior to their incorporation into an edible product. To the extent that it is necessary for an understanding of this invention, the descriptive material of the Carroll, et al patent relating to processing the protein fibers is incorporated herein. However, the particular mechanism for getting the fibers to a usable state comprises no part of this invention. The inventor claims no special expertise in the processing of protein fibers, only in the field of food preparation and marketing is there any expertise claimed.

Having thus come upon the apparently unrelated information about (1) the desirability of particular products of sandwich type materials to be modified by locality to be compatible with contemporary tastes in the European area and (2) discovering the edible but lower priced textured protein which might be combined with ground meat, the inventor set upon experiments leading to this invention.

The first experiment involved ground beef including both lean and fat, textured soy protein fibers and chopped beef kidney, believing this to be a possible flavor suitable for marketing in Great Britain. During the course of several combinations and processes of preparing the product, it was discovered that the kidney performed three functions, two might possibly be expected but one came as a complete surprise.

The kidney flavor being somewhat more powerful than the protein flavor tends to mask the protein flavor to a great extent while letting the ground beef flavor come through, with a delicate kidney flavor overriding the totality of the patty. This could be expected because of the relatively strong, distinctive kidney flavor although it came somewhat as a surprise that the relatively unpalatable flavor of the soy protein was masked to the extent that it was. As is well known in the art, the flavor of soy protein is not appetizing to some palates and soy protein was the product being used in experiments at this time.

Another more surprising development was the binding characteristic of the kidney. In modifying the recipe it was discovered that the finer the comminution of the kidney the better did the sandwich patty hold it shape during the subsequent cooking. The conclusion was that the kidney itself contained some material capable of binding the comminuted protein fibers and ground meat together.

Additionally, with the kidney chopped to a very fine consistency the color of the mixed raw patty acquired a "bloom" or color normally associated with ground meat. Thus, the red appearance in the initially formed raw patty and the subsequent brown color of the cooked product contributed to the aesthetic appreciation of the product.

The inventor was later informed that the fine comminuting of the kidney released soluble and intercellular protein such as albumins and globulins which tended to coat and impregnate the textured protein. Frankly, the inventor does not know with certainty what causes the binding phenomenon described above but does known that if the combination is made in the manner described herein the results are satisfactory.

Having come to an acceptable product having the kidney flavor the inventor tried similar recipes with beef liver and discovered many of the same characteristics described for kidney and in particular the three most important characteristics (1) distinctive flavor maskings, (2) bloom in the raw state and (3) binding of cooked protein fibers. The final conclusion was that kidney and liver, fluidized or emulsified to a consistency approximating peanut butter, tends to give the best results in binding, blooming and flavor maskings.

Later experiments revealed that most glandular tissues of animals including beef, chicken, lamb, hog and others acceptable for human consumption were suitable for this process and product. They included liver, gizzard, kidney, heart, sweetbreads and mixtures thereof. These products often come under the heading of offal but they are more properly referred to as glandular tissues as opposed to muscle tissues such as are found in the traditional ground hamburger mix.

Preparing the product for cooking led to a discovery of a preferred method of preparing the product. First the textured protein used in this invention comes in dehydrated form. It was found to be desirable to hydrate the protein to a certain extent prior to mixing with the other ingredients. It was also discovered that if the protein is not completely hydrated but is only partially hydrated, water mixed with the comminuted animal glandular tissue will tend to carry the flavor and blooming characteristics more uniformily throughout the textured protein when they are subsequently mixed. After the two products are mixed to a uniform consistency they are combined with ground muscle tissue and salt and spices to taste.

It was also discovered that if salt is added directly to the kidney prior to its combination with the dehydrated protein, the osmotic forces are modified (apparently) which inhibits the release of the intercellular products to the extent necessary to properly color the patty and give it the desirable bloom. Exactly why this is true is unknown to the inventor. However, it was found that when the salt and other spices were added to the mixture no earlier than the time than the ground meat was added the result was a better or redder appearing sandwich patty.

As was previously indicated, the binding characteristic of glandular tissue came as a surprise to the inventor. In fact he did not even know of the need for binding at the time he began his experiments. Later research in the Patent Office revealed that this was a problem and that the most usual binding agent added to the protein is an alginate derived most often from seaweed. Various binding agents are discussed in the previously cited Carroll, et al. patent along with the U.S. Pat. Nos. to Ishler, 3,093,483; Kelco, 3,266,906; Kjelson, 3,343,963 and; Miller, 3,455,701. These enumerated synthetic binding agents are believed to be somewhat unacceptable to many of the public today because of the desire for "natural" foods and it is believed that from the standpoint of the "health food consumer" the inventor's food combination will be more acceptable.

PREFERRED EMBODIMENT

Having thus described the background of the invention, very little remains for discussion except for specific recipes and processes for preparing the product. It was conceived that there may be more than one marketable product involved herein. It is thought that the combination of textured protein with the comminuted animal glandular tissue could be mixed, frozen and marketed to commercial establishments as well as to the consumer market. Many people like the flavor of the mixture of protein and kidney and/or liver alone, without comminuted beef as an ingredient. Additionally, it is thought that the prepared protein-glandular tissue mixture could be purchased by a consumer or a restaurant and mixed with ground beef, formed into a patty, etc.

The consuming public appears to be ready for the flavor of the resulting patty, whether served in a manner similar to hamburger steak or as a sandwich filler. Thus, numerous experiments were conducted to find acceptable mixtures of protein, glandular tissue and muscle tissue.

In one extreme, it is found that with mixtures of twenty parts protein and one part kidney, the kidney performs its binding function adequately as well as providing a certain amount of flavor masking and some of the blooming characteristics. Obviously, the amount of flavor masking with this ratio of ingredients cannot be great. More of the kidney must be added for most consumers to sufficiently mask the flavor of the protein and allow the beef flavor to prevail. However, where the flavor of the particular glandular tissue tends to be the contemporary flavor mode, such as liver in Germany, larger concentrations of the glandular tissue are desirable. For example the mixture of twenty parts kidney to one part textured protein is compatible with contemporary tastes in some British communities.

Equally important in determining the proportions of glandular tissue to protein is the recognition that the flavor of beef liver is much stronger than that of chicken heart. As a consequence the degree of flavor masking by the particular glandular tissue is not uniform from one gland to another or one animal to another. However, the fact of the nonuniformity does not affect the blooming characteristic nor the binding characteristic which is very important in this area of technology. As was previously indicated, the desirable flavoring for particular ethnic or nationalistic regions varies from one geographic location to another as well as from individual to individual. However, one can usually design a mixture which is generally acceptable with a large segment of the particular ethnic group and to be quite specific, the mixtures are designed based on flavor; the accompanying bloom and bindings are at acceptable levels when the flavor is right; thus, the flavor of the product is the criterion for proportions.

Thus, it can be seen that a wide variety of mixtures of products within an acceptable range, i.e., anywhere from twenty to one ratios to one to twenty ratios in mixture of glandular tissues to textured protein may be acceptable under some circumstances, so long as the bloom and binding functions are also performed and they will be with all but the most extreme proportions.

As can be seen from the particular case involved with nationalities and geographic locations, the amount of ground beef may also vary from one geographic location to another. Thus, as much or as little beef as is desirable may be added to the protein, depending upon individual taste.

In the preferred embodiment the following combination was employed:

| APPROXIMATE PROPORTIONS | INGREDIENTS |
|---|---|
| 1/3 | textured protein (dehydrated) |
| 1/6 | comminuted glandular tissue (kidney) |
| 1/3 | ground muscle tissue (beef) |
| 1/6 | dehydrated onion along with small amount of salt |

This product is prepared by mixing the dehydrated protein about one to one with water; comminuting the glandular tissue to the consistency of peanut butter and mixing one part glandular tissue with two parts water; and then mixing the partially rehydrated protein and glandular tissue together. The reason for this sequence of mixing has previously been explained and will not be repeated here.

Subsequently, the ground muscle tissue is mixed with the combined protein and glandular tissue. The salt and dehydrated onion may be added with the ground muscle tissue or later as desired. A formed patty of the product is then ready for cooking.

The amount of water added with the glandular tissue or striated muscle tissue will, to some extent, depend on the aging characteristics of the meat or the storage history of the products prior to use.

As is well known in the art there are a plurality of different sources of textured protein. The term "textured protein" means taking the protein in question and treating it, such that it will have a characteristic not inherent in the natural product. This term is usually applied to plant protein but may in fact, refer to proteins extracted from many sources. It is understood that reference throughout is to protein fiber or granules having a "texture" resembling natural meat. Plant protein analogues of ground beef are usually prepared by extruding soy flour, concentrates or the like as fibers; adding appropriate colors and flavors; and then dehydrating the product for stability. Upon rehydration these granules are very similar to ground beef. The characteristic of an analogue of ground beef is usually accomplished by using a dry extruded granule of the protein. The exact mechanism for accomplishing this result is not a part of this invention, but it is well known to those having ordinary skill in the art.

There are also several sources of the usable protein to be treated and they include animal flesh, vegetable (soy beans, etc.,) and whey from cheese making. The source of the protein is totally immaterial to this invention. All that is required herein is the texture desired, how one gets that texture involves technology which is not the subject of this invention.

It is believed that the prime market for this product is in the sandwich field, however, it is clearly applicable to use as a sausage, lamb patty, ham spread, etc.

As previously explained the purpose of adding water to both the dehydrated protein and the kidney is to allow the water to dissolve the kidney to a certain extent or disperse the soluble products in the kidney and carry them into the textured protein to give it the blooming characteristics as well as to coat and impregnate the protein fibers or granules themselves in a superior manner. The glandular tissue is comminuted in a raw state and it should be understood that all the products used in this mixture are raw as mixed and they are cooked together to form the product.

While the combination of glandular tissue with textured protein is discussed at length herein, it will be obvious to those having ordinary skill in the art that appropriate flavor extracts could be combined with some binding agent such as egg white to produce an edible mixture and such is within the contemplation of this invention.

One of the problems with the sale of hamburger type sandwiches today is the cost of the meat in the product; with the meat prices continuing to spiral, it is becoming prevalent to add more fat to the meat patty and to use cereal extenders to prevent the traditional shrinkage which results from the cooking of the fat. All weekend chefs can remember cooking very fat hamburger and seeing the size of the patty skrink drastically. Adding certain cereal extenders and synthetic binders prevents the gross shrinkage which is so well known, although such additives do modify the flavor of the cooked product. As a rough approximation, the proportion of fat in hamburger is from twenty to fifty per cent depending upon the quality of the product. Some fat is clearly desirable because it adds a distinctive flavor to the product, which flavor is an expected ingredient in American style hamburgers. The interesting and significant part of the instant invention is that it allows a greater portion of fat compared to the lean without the traditional shrinkage and without the chemical and cereal additives to prevent shrinkage. The comminuted glandular tissue, ground meat and textured protein together as a mix substantially reduce the gross amount of fat in the total product, thereby drastically reducing the resulting shrinkage. The economic implications are obvious.

To clarify, the dehydrated onion and salt proportions in the above preferred embodiment are unique to the palate of the family of the inventor and dehydrated onion is certainly not a necessary ingredient in this invention. The commercial aspects are yet to be explored.

One other recipe found particularly acceptable in England was as follows:

| APPROPRIATE PROPORTIONS | INGREDIENTS |
|---|---|
| Three parts | textured protein (dehydrated) |
| One part | comminuted glandular tissue (50% beef kidney & 50% beef liver) |
| Three parts | ground beef (40% fat) |

The protein and glandular tissue are mixed in the same way as previously indicated. However, the water to be absorbed by the dehydrated protein is approximately twice the dry weight of the protein. Thus, the amount of water mixed with the glandular tissue should be about the same as the water mixed with the protein.

Why the liver-kidney combination particularly attracted the British palate is unknown. However, the fact is, the proportions outlined above were preferred by the majority of those polled in the limited tests conducted.

While specific examples of uses or proportions with chicken heart, goose liver, hog liver, etc., are not given, it should not be assumed that the enumerated examples are the only ones tested. Numerous tests were conducted with almost all possible combinations and proportions. The resulting flavor, binding and blooming were satisfactory in all cases but, like pies, some are preferred over others. In this purely subjective test, the two above indicated recipes are the choice of the test sample. Obviously, slightly modified recipes will be more suitable for other people.

Having thus described the invention it should be stated that the inventor's discussion and description of the invention above will suggest obvious modifications to those having ordinary skill in the art. Thus, the inventor does not intend to be bound by the specifications or the terminology used in describing the invention. Rather, the inventor intends to be bound only by the scope and spirit of the appended claims.

I claim:

1. An edible mixture including textured protein mixed with an amount of comminuted animal glandular tissue sufficient to mask the flavor of the protein.

2. The mixture of claim 1 wherein said glandular tissue is selected from the group consisting of kidney, liver, heart, gizzard, sweetbreads and mixtures thereof.

3. The mixture of claim 1 wherein the ratio of animal glandular tissue to protein is at least one to twenty.

4. The mixture of claim 3 wherein the ratio of animal glandular tissue to protein is not over twenty to one.

5. The mixture of claim 1 wherein the ratio of animal glandular tissue to protein is not over twenty to one.

6. The mixture of claim 1 wherein the proportion of animal glandular tissue to protein is approximately one to three.

7. The mixture of claim 1 wherein the glandular tissue is comminuted to approximately the consistency of peanut butter.

8. An edible mixture including comminuted animal muscle tissue, textured protein and an amount of comminuted animal glandular tissue sufficient to mask the flavor of the protein.

9. The mixture of claim 8 wherein the glandular tissue is selected from the group consisting of kidney, liver, heart, gizzard, sweetbreads and mixtures thereof.

10. The mixture of claim 8 wherein the ratio of animal glandular tissue to protein is at least one to twenty.

11. The mixture of claim 10 wherein the ratio of animal glandular tissue to protein is not over twenty to one.

12. The mixture of claim 8 wherein the ratio of animal glandular tissue to protein is not over twenty to one.

13. The mixture of claim 8 wherein the proportion of animal glandular tissue to protein is approximately one to three.

14. The mixture of claim 8 wherein the glandular tissue is communited to approximately the consistency of peanut butter.

15. A method of making an edible patty for a sandwich comprising, mixing comminuted animal muscle tissue with textured protein and an amount of animal glandular tissue sufficient to mask the flavor of the protein, said glandular tissue being selected from the group consisting of heart, liver, kidney, gizzard, sweetbreads and mixtures thereof, forming the mixture into a suitably shaped and sized patty and cooking the patty.

16. A method of making an edible patty for a sandwich comprising, mixing two parts dehydrated textured protein with two parts water, comminuting one part animal glandular tissue and mixing with two parts water, mixing the protein and glandular tissue to a uniform mixture, combining said uniform mixture with two parts comminuted animal muscle and forming into a suitable shape for cooking or packaging.

17. A method of making an edible mixture comprising, mixing two parts dehydrated textured protein with two parts water, comminuting one part animal glandular tissue and mixing with two parts water, mixing the protein and glandular tissue and forming into a shape suitable for cooking or packaging.

* * * * *